F. RASPOTNIK.
VEHICLE PROPULSION MECHANISM.
APPLICATION FILED DEC. 10, 1920.
1,383,661.
Patented July 5, 1921.
2 SHEETS—SHEET 2.
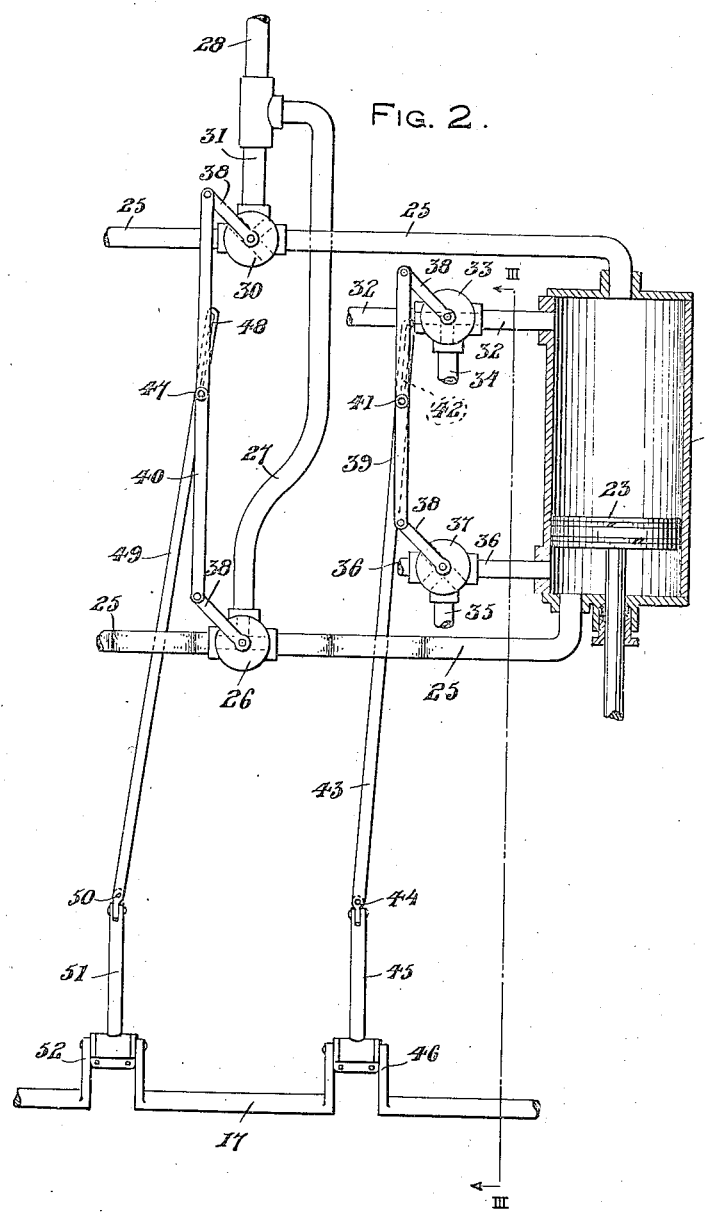
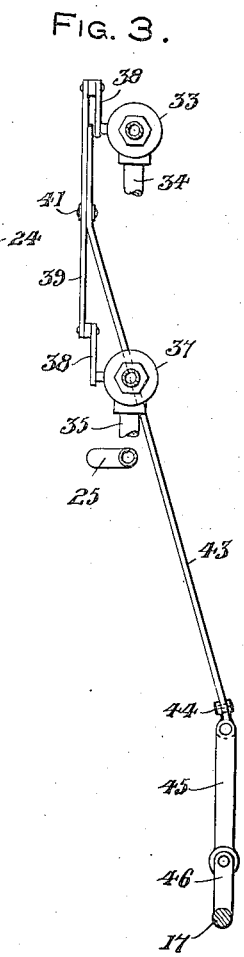
Inventor
F. Raspotnik
By J. K. Bryant.
Attorney

UNITED STATES PATENT OFFICE.

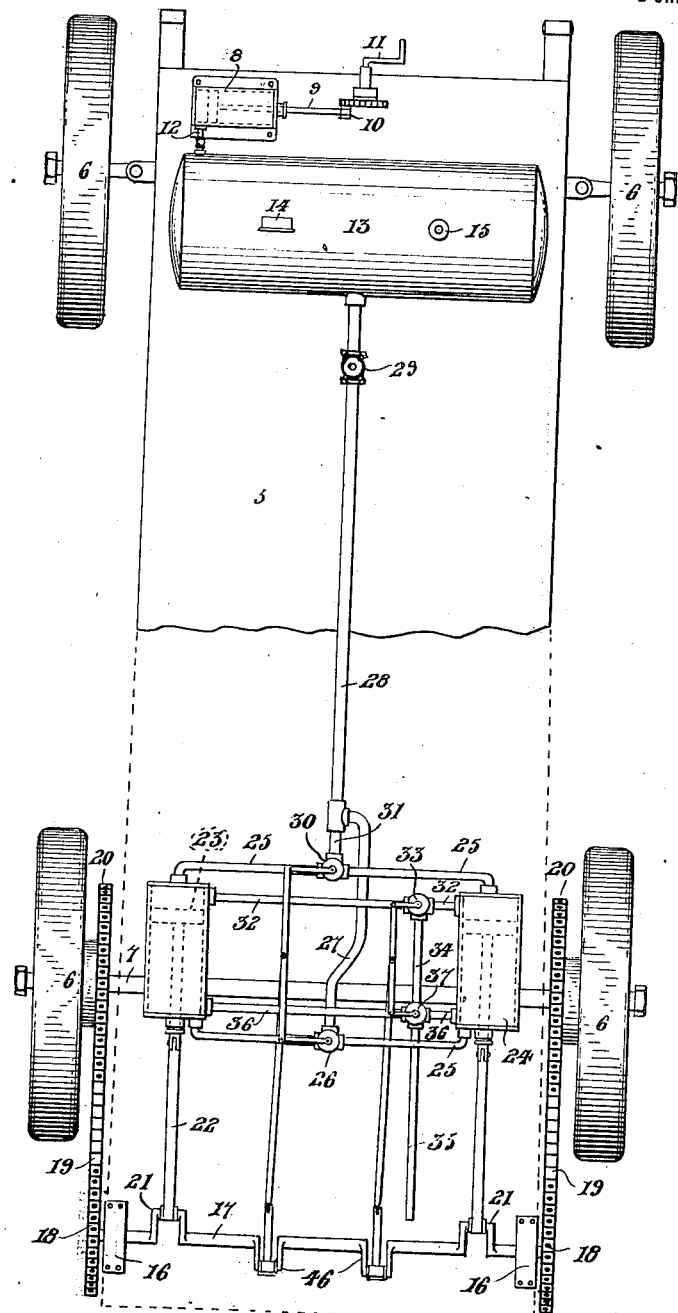

FRANC RASPOTNIK, OF WESTMORELAND CITY, PENNSYLVANIA.

VEHICLE PROPULSION MECHANISM.

1,383,661. Specification of Letters Patent. Patented July 5, 1921.

Application filed December 10, 1920. Serial No. 429,792.

*To all whom it may concern:*

Be it known that I, FRANC RASPOTNIK, a citizen of Jugo-Slavia, residing at Westmoreland City, in the county of Westmoreland and State of Pennsylvania, have invented certain new and useful Improvements in Vehicle Propulsion Mechanisms, of which the following is a specification.

This invention relates to certain new and useful improvements in vehicle propulsion mechanism and is particularly designed for the propulsion of toy automobiles or the like by the use of compressed air as a motive agent.

An object of this invention is the provision of a toy vehicle having a miniature power plant including an air storage tank and a pump to supply compressed air thereto, the pump being manually operable by a small crank positioned so as to have the appearance of the usual starting crank of an automobile, and the rear wheels of the vehicle being operatively connected to a pair of compressed air motor cylinders, and automatic valve mechanism being provided for properly controlling the flow of air to the cylinders and for controlling the exhaust of the air therefrom.

Further objects of the invention will become apparent as the nature of the same is better understood, and the invention consists in the novel form, combination and arrangement of parts hereinafter more fully described, shown in the accompanying drawings and claimed.

In the drawings, wherein like reference characters indicate corresponding parts throughout the several views, Figure 1 is a somewhat diagrammatic plan view of a miniature vehicle equipped with the propulsion mechanism of the present invention and shown partly broken away, Fig. 2 is an enlarged view partly in plan and partly in horizontal section of the valve operating mechanism and one of the cylinders shown in Fig. 1, and Fig. 3 is a longitudinal sectional view taken substantially upon line III—III of Fig. 2.

Referring more in detail to the several views, the present invention embodies a small wheeled vehicle of the type and general construction generally mechanically operated by spring motors and the detailed body construction of which does not enter in the present invention. It includes, broadly, a base or frame 5 having front and rear supporting wheels 6, the front wheels being mounted upon stub axles, and the rear wheels being fastened to a rotatable rear axle 7.

Mounted upon the frame or base 5 at the forward end thereof is a small pump 8 whose piston rod 9 is operatively connected to a crank 10 adapted to be rotated by a handle or hand crank 11 positioned substantially centrally between the sides of the frame approximately in the position where the starting crank of a motor vehicle is usually found. The pump 8 is connected by a pipe 12, having a check valve therein, with a comparatively large air storage tank 13 positioned transversely of the frame 5 just back of said pump, and this tank may be provided with a miniature pressure gage 14 as well as a safety valve 15.

A pair of brackets 16 are fastened in transverse alinement to the under side of the frame 5 at the rear end thereof, and they rotatably support a crank shaft 17 having sprocket wheels 18 secured upon the ends thereof. Sprocket chains 19 pass around the sprocket wheels 18 and also forwardly and around further sprocket wheels 20 provided upon the rear axle 7, whereby rotation of crank shaft 17 will cause rotation of the rear supporting wheels 6. The end cranks 21 of the shaft 17 are operatively connected by pitman rods 22 to the rods of piston heads 23 which are shown by dotted lines in Fig. 1, and one of which is shown in full lines in Fig. 2. Each piston 23 works within a cylinder 24 and the cylinders are provided with intake pipes 25 at their opposite ends. The intake pipes at the rear ends of the cylinders enter the opposite ports of a three-way valve 26, and the third port of said valve is connected by means of a pipe 27 with the main supply pipe 28 which extends from the storage tank 13 and which is provided with a manual control valve 29. Similarly, the intake pipes 25 at the forward ends of the cylinders communicate with the opposite ports of another three-way valve 30 whose third port is connected by a short pipe 31 with the main supply pipe 28.

An exhaust pipe 32 extends from the forward end of each cylinder and they enter the opposite ports of another three-way valve 33 whose third port is connected by a pipe 34 with an exhaust pipe 35. Similarly, an exhaust pipe 36 extends from the rear end of each cylinder and they enter the opposite ports of a still further three-way valve 37 whose third port is also connected to the exhaust pipe 35.

As shown by dotted lines in Fig. 2, the rotatable member of valve 30 is normally positioned to close communication between pipes 31 and 25 when valve 26 is positioned to open communication between pipe 27 and the adjacent pipes 25, and valve 33 is then positioned to open communication between pipes 32 and 34 while valve 37 is arranged to close communication between pipes 36 and exhaust pipe 35.

An arm 38 extends laterally from the valve stem of each of valves 26, 30, 33 and 37, and the outer ends of the arms 38 of valves 33 and 37 are connected by a link 39 while the arms 38 of the valves 26 and 30 are similarly connected by a link 40.

Link 39 is provided with a pin 41 passing through a slot 42 of a pitman 43 which is universally connected as at 44 with a pitman 45 provided on the crank 46 of the crank shaft 17. Similarly, the link 40 is provided with a pin 47 passing through the slot 48 provided in the forward end of a pitman 49 which is universally connected as at 50 with a short pitman 51 provided upon the crank 52 of said crank shaft 17.

In operation, with the valves positioned as shown in Fig. 2, the crank handle 11 is rotated so as to cause pump 8 to supply compressed air to the tank 13. The valve 29 is then opened and the air passes through pipes 28 and 27 to the rear pipes 25 through the ports of valve 26, and said air thus passes behind the piston heads 23 so as to force the latter forwardly. When this takes place the air may exhaust from the forward ends of the cylinders 24 through pipes 32 and through the ports of valve 33 to pipes 34 and 35, into the atmosphere. This forward movement of the pistons causes rotation of shaft 17, which rotation is imparted to the wheel 6 through the gearing described, and when the pistons 23 have been forced to their extreme forward position, the pitmen 43 and 49 have moved rearwardly substantially to engage the pins 41 and 47 whereby the links 39 and 40 are moved rearwardly so as to close valves 33 and 26 and simultaneously open valves 30 and 37. Air is then admitted through pipe 31 to the forward pipes 25 into the forward ends of the cylinders 24 so that the pistons 23 are moved rearwardly for continuing the rotation of the shaft 17. When the pistons 23 move rearwardly the air may exhaust from behind the same through pipes 36 and the ports of valve 37 to the exhaust pipe 35 and then into the atmosphere. Obviously, these events or operations occur in such rapid and timed relation as to propel the vehicle forwardly until the valve 29 is closed or until the entire supply of air is exhausted from the tank 13. The toy may be operated for considerably longer than is at present obtained from spring motors in toys of this kind, and the same will have a more realistic appearance of an automobile.

It is believed that the construction and operation of the present invention will be readily understood and appreciated from the foregoing description.

Minor changes may be made without departing from the spirit and scope of the invention as claimed.

What is claimed as new is:—

1. A toy vehicle including a frame provided with front and rear supporting wheels, a motor operatively connected to the rear supporting wheels for rotatably driving the latter and arranged adjacent thereto, a storage tank connected to the motor by means of a supply pipe and arranged at the forward end of the frame, and a pump arranged in front of the storage tank or supplying compressed air to the latter, said pump being provided with operating mechanism including a hand crank arranged at the forward end of the frame in the position usually provided for the starting crank of an automobile.

2. A toy vehicle including a frame provided with front and rear supporting wheels and having an air pump transversely mounted thereon at its forward end, a crank arranged at the forward end of the frame substantially midway between the sides thereof and operatively connected to the pump for operating the latter, a storage tank on the frame, means for conducting compressed air from the pump to said storage tank, an air outlet pipe for said tank, a manual control valve for said outlet pipe, a compressed air motor arranged at the rear end of the frame and provided with inlet pipes associated with the outlet pipe of said tank, and operating connections between the motor and the rear supporting wheels whereby the latter are rotatably driven when the motor is operated.

3. A toy vehicle including a frame provided with front and rear supporting wheels and having an air pump transversely mounted thereon at its forward end, a crank arranged at the forward end of the frame substantially midway between the sides thereof and operatively connected to the pump for operating the latter, a storage tank on the frame, means for conducting compressed air from the pump to said storage tank, an air outlet pipe for said tank, a manual control valve for said outlet pipe, a compressed air motor arranged at the rear end of the frame and provided with inlet pipes associated with the outlet pipe of said tank, operating connections between the motor and the rear supporting wheels whereby the latter are rotatably driven when the motor is operated, said motor including cylinders having pistons reciprocably mounted therein, pitmen connected to said pistons, a crank shaft arranged transversely of the frame rearwardly of said cylinders and having a crank connected to each of said pitmen, and sprocket gearing between said crank shaft and the rear supporting wheels.

4. In a toy vehicle of the class described, a storage tank for compressed air provided with a valve controlled outlet pipe, a three-way valve having one port communicating with said outlet pipe, a pair of compressed air motor cylinders having pistons reciprocable therein, inlet pipes at the forward ends of said cylinders, each connected to one of the remaining ports of said three-way valve, a branch pipe extending from said outlet pipe, a second three-way valve having one port communicating with said branch pipe, inlet pipes extending from the rear ends of said cylinders and each communicating with one of the remaining ports of said second named three-way valve, said three-way valves including rotatable ported members arranged so that when one is open the other is closed and having lateral arms rigid therewith, a link connecting said arms, a crank shaft, pitmen connecting said link with a crank of said crank shaft, and pitmen connecting the pistons with further cranks of said crank shaft.

5. In a toy vehicle of the class described, a storage tank for compressed air provided with a valve controlled outlet pipe, a three-way valve having one port communicating with said outlet pipe, a pair of compressed air motor cylinders having pistons reciprocable therein, inlet pipes at the forward ends of said cylinders, each connected to one of the remaining ports of said three-way valve, a branch pipe extending from said outlet pipe, a second three-way valve having one port communicating with said branch pipe, inlet pipes extending from the rear ends of said cylinders and each communicating with one of the remaining ports of said second named three-way valve, said three-way valves including rotatable ported members arranged so that when one is open the other is closed and having lateral arms rigid therewith, a link connecting said arms, a crank shaft, pitmen connecting said link with a crank of said crank shaft, pitmen connecting the pistons with further cranks of said crank shaft, air exhaust pipes for the forward ends of the cylinders, a three-way valve having said exhaust pipes communicating with opposite ports thereof, an exhaust pipe, a further pipe leading from the third port of the last named three-way valve and communicating with said exhaust pipe, further exhaust pipes for the rear ends of said cylinders, another three-way valve having the last named exhaust pipes communicating with opposite ports thereof and having the main exhaust pipe communicating with the third port of the same, said last named three-way valves including rotatable ported members having lateral arms and arranged so that when the rear exhaust valve is closed, the forward exhaust valve is open while the forward inlet valve is closed and the rear inlet valve is open, a link connecting the arms of said exhaust valves, and means including a pitman having a pin and slot connection with said link for operatively connecting a further crank of said crank shaft to the rotatable members of said exhaust valves.

In testimony whereof I affix my signature.

FRANC RASPOTNIK.